(12) United States Patent
Ono et al.

(10) Patent No.: US 10,435,570 B2
(45) Date of Patent: Oct. 8, 2019

(54) CIRCUMFERENCE COATING MATERIAL, BONDING MATERIAL, HONEYCOMB STRUCTURE, AND METHOD OF PRODUCING HONEYCOMB STRUCTURE

(71) Applicant: NGK INSULATORS, LTD., Nagoya (JP)

(72) Inventors: Yohei Ono, Nagoya (JP); Yasushi Uchida, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 238 days.

(21) Appl. No.: 15/054,532

(22) Filed: Feb. 26, 2016

(65) Prior Publication Data

US 2016/0280937 A1    Sep. 29, 2016

(30) Foreign Application Priority Data

Mar. 25, 2015  (JP) ................................. 2015-062268

(51) Int. Cl.
*B32B 3/12*   (2006.01)
*B32B 37/14*  (2006.01)
(Continued)

(52) U.S. Cl.
CPC ................. *C09D 7/61* (2018.01); *B32B 3/12* (2013.01); *B32B 37/146* (2013.01); *C04B 28/24* (2013.01); *C04B 38/0016* (2013.01); *C04B 38/0019* (2013.01); *C04B 41/009* (2013.01); *C04B 41/5089* (2013.01); *C04B 41/85* (2013.01);
(Continued)

(58) Field of Classification Search
None
See application file for complete search history.

(56) References Cited

U.S. PATENT DOCUMENTS 4,204,907 A * 5/1980 Korklan ............... C04B 28/24
                                                162/135
4,840,827 A    6/1989 Mizutani et al.
(Continued)

FOREIGN PATENT DOCUMENTS

CN   1883791 A     12/2006
EP   0 206 717 A2  12/1986
(Continued)

OTHER PUBLICATIONS

Japanese Office Action (Application No. 2015-062268) dated Sep. 12, 2017.
(Continued)

*Primary Examiner* — David Sample
(74) *Attorney, Agent, or Firm* — Burr & Brown, PLLC

(57) ABSTRACT

The circumference coating material fills a recessed groove that is formed on a circumferential surface of a honeycomb fired body and extends an axial direction at which a part of cells are opened to the outside and to cover the circumferential surface, thereby forming a circumferential wall on the circumferential surface of a honeycomb structure, and the circumference coating material includes colloidal silica in a part of raw materials to be used and has a chlorine concentration of 150 ppm or less. In addition, the colloidal silica to be used has a chlorine concentration of 500 ppm or less, and the colloidal silica is produced using at least any one acid of sulfuric acid, phosphoric acid, and organic acid.

6 Claims, 2 Drawing Sheets

(51) Int. Cl.

| | | |
|---|---|---|
| *C09D 7/61* | (2018.01) | |
| *C04B 41/85* | (2006.01) | |
| *C04B 38/00* | (2006.01) | |
| *C04B 41/00* | (2006.01) | |
| *C04B 41/50* | (2006.01) | |
| *C04B 28/24* | (2006.01) | |
| *F01N 3/28* | (2006.01) | |
| *C04B 111/10* | (2006.01) | |
| *C04B 111/00* | (2006.01) | |

(52) U.S. Cl.
CPC ..... *B32B 2255/20* (2013.01); *B32B 2305/024* (2013.01); *C04B 2111/00793* (2013.01); *C04B 2111/1062* (2013.01); *F01N 3/2828* (2013.01); *F01N 2330/06* (2013.01)

(56) References Cited

U.S. PATENT DOCUMENTS

| | | | |
|---|---|---|---|
| 5,221,497 A * | 6/1993 | Watanabe | C01B 33/145 106/287.34 |
| 5,629,067 A | 5/1997 | Kotani et al. | |
| 2003/0022788 A1 | 1/2003 | Tanaka et al. | |
| 2003/0137071 A1 | 7/2003 | Noguchi et al. | |
| 2005/0158488 A1* | 7/2005 | Oiwamoto | B41M 5/5218 428/32.37 |
| 2006/0105139 A1 | 5/2006 | Suwabe et al. | |
| 2006/0210764 A1 | 9/2006 | Yamada et al. | |
| 2006/0290036 A1* | 12/2006 | Kaneda | C04B 35/565 264/630 |
| 2006/0292336 A1 | 12/2006 | Ohno et al. | |
| 2007/0158879 A1 | 7/2007 | Suwabe et al. | |
| 2008/0241003 A1 | 10/2008 | Ido et al. | |
| 2008/0274324 A1 | 11/2008 | Mizutani | |
| 2010/0151185 A1 | 6/2010 | Okazaki | |
| 2011/0163262 A1* | 7/2011 | Higuchi | C01B 33/14 252/79.1 |
| 2011/0237426 A1* | 9/2011 | Kikuchi | B82Y 30/00 502/69 |
| 2012/0100336 A1 | 4/2012 | Cai et al. | |
| 2012/0244042 A1* | 9/2012 | Mizutani | B01D 46/2429 422/180 |
| 2013/0052117 A1 | 2/2013 | Imai et al. | |
| 2013/0224430 A1 | 8/2013 | Chapman et al. | |
| 2013/0239556 A1 | 9/2013 | Itou et al. | |
| 2013/0255212 A1 | 10/2013 | Takahashi et al. | |
| 2014/0295132 A1 | 10/2014 | Okazaki | |
| 2015/0344375 A1 | 12/2015 | Chapman et al. | |

FOREIGN PATENT DOCUMENTS

| | | |
|---|---|---|
| EP | 0 283 224 A1 | 9/1988 |
| EP | 1 491 499 A1 | 12/2004 |
| EP | 1 533 032 A1 | 5/2005 |
| EP | 1 974 789 A1 | 10/2008 |
| EP | 1 974 797 A1 | 10/2008 |
| EP | 2 366 444 A1 | 9/2011 |
| EP | 2 650 046 A1 | 10/2013 |
| EP | 2 767 527 A1 | 8/2014 |
| JP | S61-291665 A | 12/1986 |
| JP | H01-268836 A | 10/1989 |
| JP | 1-317115 | 12/1989 |
| JP | H01-317115 A1 | 12/1989 |
| JP | 3-060737 | 3/1991 |
| JP | H03-060737 A | 3/1991 |
| JP | H06-041695 A | 2/1994 |
| JP | 2613729 | 2/1997 |
| JP | 2613729 B2 | 5/1997 |
| JP | H11-151436 A | 6/1999 |
| JP | 2002-326879 A | 11/2002 |
| JP | 2004-016982 A | 1/2004 |
| JP | 2004-75524 A1 | 3/2004 |
| JP | 2006-255542 | 9/2006 |
| JP | 2006-255542 A | 9/2006 |
| JP | 2009-269763 A1 | 11/2009 |
| JP | 2011-194312 A1 | 10/2011 |
| JP | 2012-215102 A1 | 11/2012 |
| JP | 2013-203572 A1 | 10/2013 |
| WO | 2008/143225 A1 | 11/2008 |
| WO | 2011/108649 A1 | 9/2011 |

OTHER PUBLICATIONS

Extended European Search Report, European Application No. 16159114.4, dated Jul. 26, 2016 (16 pages).
European Office Action, European Application No. 16159114.4, dated Mar. 8, 2018 (7 pages).
European Office Action, European Application No. 16159114.4, dated Dec. 18, 2018 (8 pages).
Yamamoto et al., "Reduction of Wall Thickness of Ceramic Substrates for Automotive Catalysts," SAE Technical Paper 900614, dated 1990 (10 pages).
Kitagawa et al., "Improvement of Pore Size Distribution of Wall Flow Type Diesel Particulate Filter," SAE Technical Paper 920144, dated 1992 (8 pages).
Third Party Japanese Opposition filed against a corresponding Japanese patent application (Japanese Patent No. 6335823) dated Jul. 20, 2018, 4 pages.
Nano material Information Sheet, Jul. 20, 2018, 14 pages.
Junbo Shen, "Operation Technology for Benzene Hydrogenation," Metallurgical Industry Press, Jan. 31, 2014, pp. 6-8 (with English translation).
Yinmin Chen, "Corrosion and Control of Power Plant Equipment," China Electric Power Press, Feb. 28, 2014. pp. 219-222 (with English translation).
Chinese Office Action (Application No. 201610133325.6) dated May 17, 2019 (with English translation).

* cited by examiner

CIRCUMFERENCE COATING MATERIAL, BONDING MATERIAL, HONEYCOMB STRUCTURE, AND METHOD OF PRODUCING HONEYCOMB STRUCTURE

The present application is an application based on JP 2015-062268 filed on Mar. 25, 2015 with the Japan Patent Office, the entire contents of which are incorporated herein by reference.

BACKGROUND OF THE INVENTION

Field of the Invention

The present invention relates to a circumference coating material, a bonding material, a honeycomb structure, and a method of producing the honeycomb structure. More specifically, the present invention relates to a circumference coating material, a bonding material, a honeycomb structure, and a method of producing the honeycomb structure that are free from corrosion of metal products or metal parts such as exhaust system pipes.

Description of the Related Art

Heretofore, a ceramic honeycomb structure has been used for a wide range of applications such as a catalyst carrier for purifying vehicle exhaust gases, a diesel particulate removing filter, or a heat storage body for a combustion apparatus. The ceramic honeycomb structure (hereinafter, simply referred to as a "honeycomb structure") is produced by preparing a forming material (kneaded material), extruding the forming material into a desired honeycomb shape using an extruder, intactly cutting, drying, and finishing the extruded forming material to a honeycomb formed body, and firing the honeycomb formed body at a high temperature. The honeycomb structure includes a partition wall that defines a plurality of polygonal lattice cells extending from one end face to the other end face which form a through channel of a fluid.

The honeycomb structure used as a catalyst carrier for purifying vehicle exhaust gases for a large vehicle such as a truck or a diesel black-smoke particulate removing filter requires a large diameter. Even in the honeycomb structure of the large diameter, the forming material can be monolithically formed into a desired shape using an extruder, but the entire honeycomb structure deforms or a part of a cell structure deforms or collapses by its own weight immediately after extrusion. In order to remove such deformation or collapse, a circumferential surface is ground after firing, and a circumference coating material is applied to the ground circumferential surface to provide a circumferential wall, and obtain a honeycomb structure of a desired shape (for example, a round pillar-shape).

Particularly, in order to improve performance of purifying vehicle exhaust gases, a tendency of a lower bulk density of the honeycomb structure such as high porosity of the honeycomb structure or thinner partition walls in the honeycomb structure is strongly required. The lower bulk density of the honeycomb structure makes it difficult to maintain a honeycomb shape immediately after extrusion and lowers mechanical strength of the honeycomb structure. For this reason, by the lower bulk density of the honeycomb structure which can be monolithically formed at a traditional bulk density, circumference grinding and circumference coating are required, and the circumference grinding and the circumference coating are also gradually required for a compact honeycomb structure.

In a case where a high heat-resistance material such as SiC is used for a material of the honeycomb structure, since the thermal expansion of the material is large, cracks occur due to temperature gradients in use when the honeycomb structure is monolithically formed. In order to prevent the occurrence of cracks, a plurality of quadrangular pillar-shaped honeycomb fired bodies (honeycomb segments) is made in advance, and a bonding material is applied to side surfaces (bonding surfaces) of the obtained honeycomb segments, and the plurality of honeycomb segments is laminated and bonded to each other in combination, thereby forming one large block-shaped honeycomb structure (honeycomb block body). Thereafter, a circumferential surface of the honeycomb block body is ground, and the honeycomb structure is worked into a desired shape (for example, a round pillar-shape).

By the grinding, a cell on the circumferential surface of the honeycomb structure is in a state where a partition wall located between the cell and the outside is removed in total or in part. Therefore, an imperfect partition wall opened to the outside and extending in an axial direction is exposed. The imperfect partition wall is easily peeled off by an external force. Accordingly, in order to protect the circumferential surface of the honeycomb structure and maintain the shape, a circumference coating material is applied to the circumferential surface of the honeycomb structure and is subjected to drying, whereby a circumferential wall is formed (for example, see Patent Document 1). That is, it is necessary to use a circumference coating material in the production of a large-sized honeycomb structure having a large honeycomb diameter, and it is necessary to use a bonding material and a circumference coating material in the case of combining a plurality of honeycomb segments to constitute a honeycomb structure.

[Patent Document 1] JP-B2-2613729

SUMMARY OF THE INVENTION

Colloidal silica is used as a part of a raw material to be used for each of a circumference coating material used for forming a circumferential wall of a honeycomb structure and a bonding material used for bonding honeycomb segments to each other. Here, an example of the colloidal silica to be used in a normal production process includes a chlorine compound such as hydrochloric acid. For this reason, such colloidal silica generally contains a chlorine component of about 1000 ppm. Note that such a chlorine concentration has no particular problem in normal use.

When metal products or metal parts such as stainless steel or iron and steel come in contact with the chlorine component (chloride ion), there is a known fact that corrosion proceeds in the total or local surface of the metal products or the like. For this reason, in the case of using these metal products or the like, measures have been taken to suppress the contact with the chloride ions as much as possible. When the honeycomb structure is used as the catalyst carrier or the like for purifying vehicle exhaust gases, there has been concern that a portion of the exhaust system pipe of the vehicle mainly composed of a metal corrodes by influence of the colloidal silica in the honeycomb structure. Although the fired honeycomb structure itself does not contain chlorine, the circumference coating material or the bonding material contains chlorine in general. Thus, the circumference coating material and the bonding material not containing chlorine is demanded.

Therefore, the present invention has been made in view of the above-described traditional circumstances, and provides a circumference coating material, a bonding material, a honeycomb structure, and a method of producing the honeycomb structure that suppress a chlorine concentration and suppress an occurrence possibility of corrosion in exhaust system pipes or the like.

According to the present invention, there are provided the circumference coating material, the bonding material, the honeycomb structure, and the method of producing the honeycomb structure that have solved the above-described problems.

According to a first aspect of the present invention, a circumference coating material that is applied to a circumferential surface of a honeycomb structure to fill a recessed groove extending in an axial direction at which a part of cells are opened to the outside and to cover the circumferential surface is provided, thereby forming a circumferential wall on the circumferential surface, wherein the circumference coating material includes colloidal silica in a part of raw materials to be used and has a chlorine concentration of 150 ppm or less.

According to a second aspect of the present invention, a bonding material that bonds a plurality of honeycomb fired bodies formed into a quadrangular pillar-shape to each other in combination is provided, thereby forming a block-shaped honeycomb structure, wherein the bonding material includes colloidal silica in a part of raw materials to be used and has a chlorine concentration of 150 ppm or less.

According to a third aspect of the present invention, a honeycomb structure having the circumferential wall formed using the circumference coating material according to the first aspect is provided, wherein the honeycomb structure has a chlorine concentration of 100 ppm or less.

According to a fourth aspect of the present invention, a honeycomb structure having the plurality of honeycomb fired bodies bonded to each other in combination using the bonding material according to the second aspect is provided, wherein the honeycomb structure has a chlorine concentration of 100 ppm or less.

According to a fifth aspect of the present invention, a method of producing a honeycomb structure is provided including: at least any one of a circumferential wall forming process in which a circumference coating material is applied to a circumferential surface of a honeycomb structure to fill a recessed groove opened to the outside and extending in an axial direction and to cover the circumferential surface, thereby forming a circumferential wall on the circumferential surface and a bonding process in which a plurality of honeycomb fired bodies formed into a quadrangular pillar-shape is bonded to each other in combination, thereby forming a block-shaped honeycomb structure; and a heating process of performing a heating treatment at a heating temperature of 600° C. or more on the honeycomb structure formed through the circumferential wall forming process and/or the bonding process, wherein the honeycomb structure subjected to the heating process has a chlorine concentration of 100 ppm or less.

According to a sixth aspect of the present invention, the method of producing the honeycomb structure according to the fifth aspect is provided, wherein the circumference coating material and/or the bonding material includes colloidal silica in a part of raw materials to be used, and the colloidal silica to be used has a chlorine concentration of 500 ppm or less.

According to a seventh aspect of the present invention, the method of producing the honeycomb structure according to the sixth aspect is provided, wherein the colloidal silica is produced using at least any one acid of sulfuric acid, phosphoric acid, and organic acid.

According to an eighth aspect of the present invention, the method of producing the honeycomb structure according to the seventh aspect is provided, wherein the organic acid is an acetic acid.

According to the circumference coating material, the bonding material, the honeycomb structure, and the method of producing the honeycomb structure of the present invention, the chlorine concentration derived from the colloidal silica to be used for the circumference coating material and/or the bonding material used for producing the honeycomb structure having a honeycomb diameter of a large size is suppressed, and thus the chlorine concentration of the entire honeycomb structure can be reduced. In particular, even when the chlorine component is contained exceeding 500 ppm, it is possible to remove the chlorine component contained in the honeycomb structure by heating the honeycomb structure at the heating temperature of 600° C. or more. As a result, the chlorine concentration of each of the circumference coating material, the bonding material, and the honeycomb structure can be suppressed to a defined value or less, and the possibility of corrosion in metal products or metal parts such as exhaust system pipes can be lowered.

DETAILED DESCRIPTION OF THE PRESENT INVENTION

Embodiments of a circumference coating material, a bonding material, a honeycomb structure, and a method of producing the honeycomb structure according to the present invention will be described below with reference to the accompanying drawings. Note that the circumference coating material or the like of the present invention is not limited to the following embodiments, but can be added various design change, modification, improvement, and the like without departing from the scope of the present invention.

Figure 1:
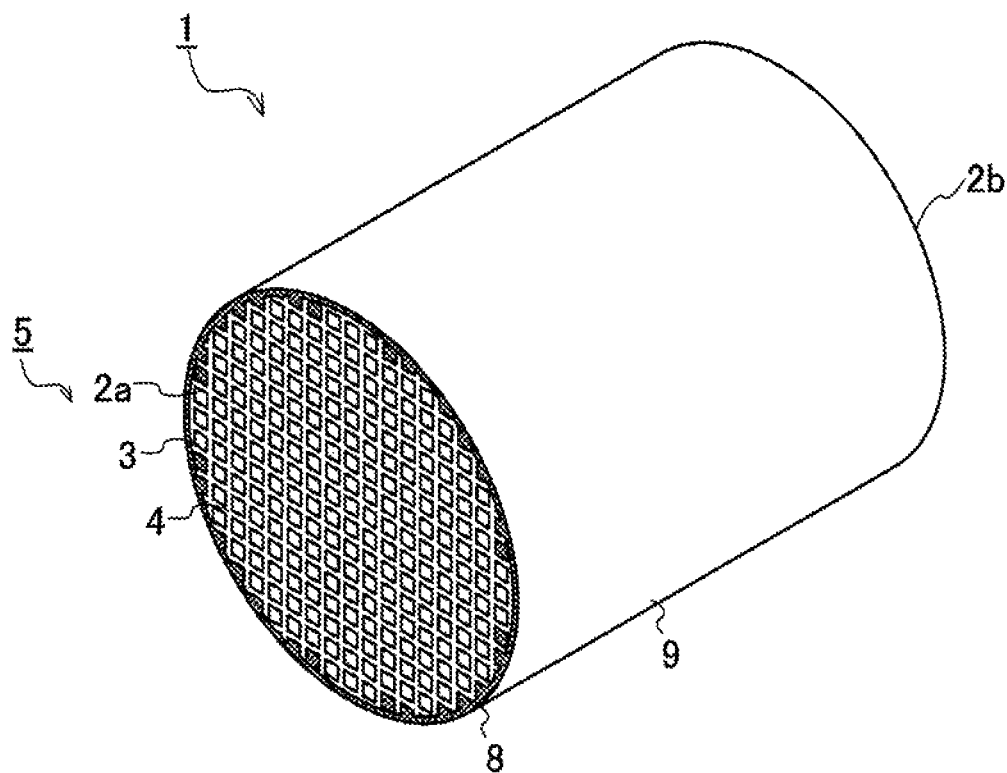
FIG. 1 is a perspective view showing schematically an example of a honeycomb structure according to an embodiment of the present invention.
Figure 2:
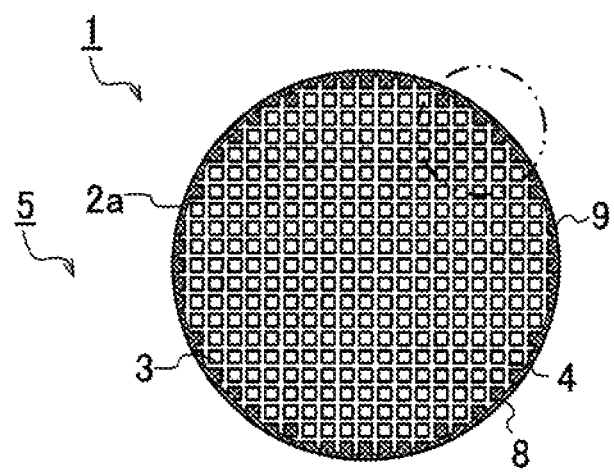
FIG. 2 is a plan view showing schematically the example of the honeycomb structure in FIG. 1.
Figure 3:
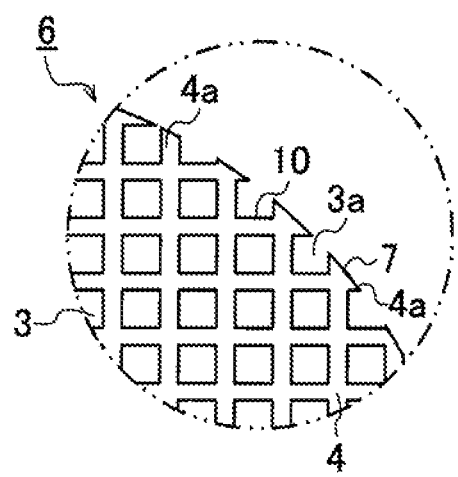
FIG. 3 is an enlarged plan view showing a region that is surrounded by a two-dot chain line in FIG. 2 and is a grinding surface of a honeycomb fired body before a circumferential wall is formed.

As shown in FIGS. 1 to 3, a honeycomb structure 1 of the present embodiment includes a honeycomb structure body 5 having a partition wall 4 that defines a plurality of quadrangular lattice cells 3 and exhibits a round pillar-shape, the quadrangular lattice cells 3 extending from one end face 2a to the other end face 2b which form a through channel of a fluid. After a honeycomb formed body is subjected to constant forming using an extruder, the obtained honeycomb formed body is fired at a predetermined firing temperature, and thus the honeycomb structure 1 is formed.

More specifically, the honeycomb structure 1 of the present embodiment includes a circumferential wall 8 obtained in such a manner that the honeycomb fired body 6 prepared by the firing of the honeycomb formed body is ground and a circumference coating material (not shown) is applied to a circumferential surface 7 of the honeycomb fired body 6 after grinding and is subjected to drying.

The honeycomb structure 1 of the present embodiment is mainly intended for use as a catalyst carrier for purifying a vehicle exhaust gas for a large vehicle such as a truck. For this reason, the honeycomb structure 1 of the present embodiment is characterized in that a honeycomb diameter is larger than that of a normal honeycomb structure. A honeycomb formed body immediately after a forming material is extruded is still in a soft state, and there is a possibility that the entire honeycomb formed body deform or a part of the cell of the honeycomb formed body deform by its own weight or the like.

The above-described deformed portion can be removed by the grinding of the circumferential surface of the honeycomb fired body 6. In addition, the honeycomb structure 1 includes the circumferential wall 8 obtained in such a manner that the circumference coating material (not shown) is applied to the ground circumferential surface 7, and is subjected to drying. Mechanical strength of the entire honeycomb structure 1 can be improved by providing the circumferential wall 8. Thus, the production of the round pillar-shaped honeycomb structure 1 as shown in FIGS. 1 and 2 is completed. Note that in FIG. 1, for brevity of illustration, hatching indicating the circumferential wall 8 of the circumferential surface 9 in the honeycomb structure 1 is omitted.

By the grinding of the circumferential surface of the honeycomb fired body 6, the outermost cell 3a located on the ground circumferential surface 7 is formed in which at least a portion of the partition wall 4 for separating the cell from the outside is removed. For this reason, recessed grooves 10 are formed, which are opened to the outside, extend in a direction of a central axis (corresponding to a direction from a front side to a depth of the paper in FIGS. 2 or 3) of the honeycomb structure 1 (or the honeycomb fired body 6), and are recessed toward the center of the honeycomb structure 1 (or the honeycomb fired body 6). When the circumference coating material is applied to the circumferential surface 7, the recessed grooves 10 are filled, the circumferential surface is covered, whereby the circumferential wall 8 is formed from the circumferential surface 7 to have a predetermined thickness.

As the circumference coating material for forming the circumferential wall 8, ceramic raw materials having the same component as that of the honeycomb formed body can be used as aggregates. Examples of the ceramic raw materials can include silicon carbide, a silicon-silicon carbide composite material, cordierite, and aluminum titanate. Water, colloidal silica functioning as a bonding agent, ceramic fiber, inorganic additives, organic additives, foamable particles, a surfactant, and the like are added to the ceramic raw material.

As the circumference coating material for forming the circumferential wall 8, colloidal silica is used. The colloidal silica is mainly produced by two methods of a "water glass method" using water glass as a raw material and an "alkoxide method" using hydrolysis of alkoxide.

The "water glass method" is performed in such a manner that an alkali silicate aqueous solution is subjected to a dealkalization treatment by coming in contact with an ion exchange resin to obtain a silicate solution, the obtained silicate solution is subjected to an acid treatment by addition of acid, and then impurities in a colloidal acidic silicic acid solution are removed using an ultrafiltration membrane, whereby an oligo-silicic acid solution is prepared. Thereafter, ammonia or the like is added to a portion of the oligo-silicic acid solution, and the portion of the oligo-silicic acid solution is subjected to a heating treatment at a range from weak acidity to weak alkalinity, whereby a "heel sol" is formed. Thereafter, the remaining oligo-silicate is slowly dropped into the obtained heel sol, and thus the growth of colloidal particles is promoted.

The "alkoxide method" is performed in such a manner that alkoxysilane (more specifically, "tetra-alkoxysilane") introduced into an acid aqueous solvent is subjected to a hydrolysis treatment to form a silicate monomer, and then the silicate monomer is added to a basic aqueous solvent and is subjected to a polymerization treatment. Accordingly, silica particles are produced while condensation of the monomer and growth of silica particles are performed simultaneously with the hydrolysis treatment.

As described above, even in any of the water glass method and the alkoxide method which are mainly used for producing the colloidal silica, the acid treatment process of adding the acid and adjusting pH becomes essential for the production of the colloidal silica. At this time, a hydrochloric acid is generally used as an acid from the viewpoint of production costs, easy availability, handling properties, or the like. For this reason, a colloidal silica produced using the hydrochloric acid contains a small amount of chlorine component (chloride ion). Therefore, the possibility of corrosion in metal products such as an exhaust system pipe is pointed out in some cases.

Therefore, the circumference coating material of the present embodiment is characterized in that a chlorine concentration of the colloidal silica to be used as a part of the raw materials to be used is 150 ppm or less. That is, as described above, sulfuric acid, phosphoric acid, acetic acid, or organic acid other than the hydrochloric acid is used for the acid treatment in the production process of the colloidal silica compared with the colloidal silica produced using mainly the hydrochloric acid. Thereby, the chlorine concentration of the colloidal silica becomes from about 1000 ppm to 500 ppm or less. When the circumference coating material and the bonding material are prepared using such colloidal silica, the chlorine concentration becomes 150 ppm or less in each of the circumference coating material and the bonding material. Then, the honeycomb structure 1 finally has a chlorine concentration of 100 ppm or less.

Figure 4:
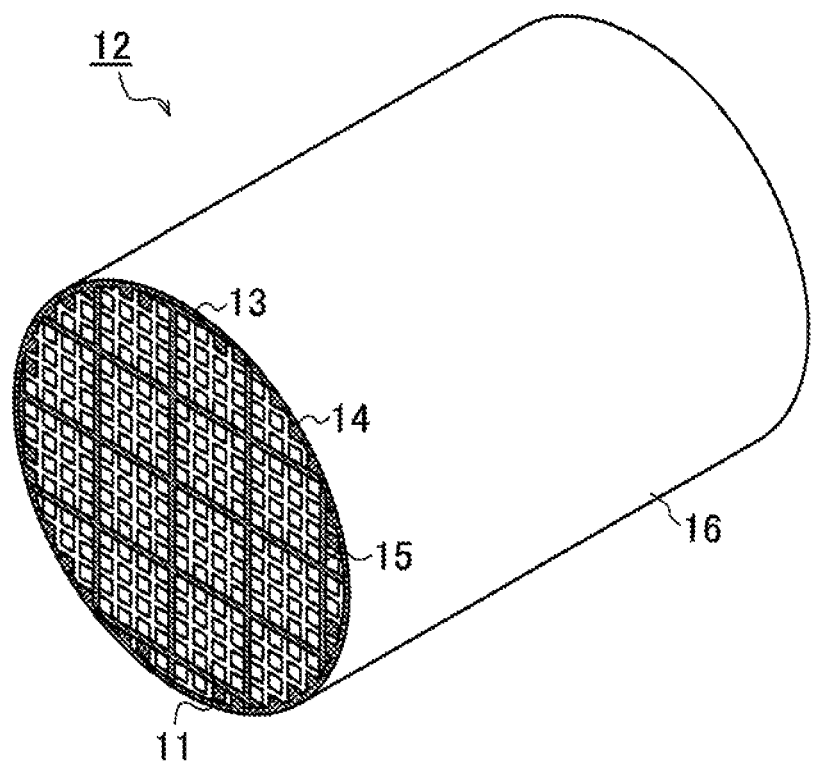
FIG. 4 is a perspective view showing schematically an example of a honeycomb structure having a configuration according to another embodiment of the present invention.

As shown in FIG. 4, a honeycomb structure 12 having a desired shape may be formed as a configuration according to another embodiment of the present invention in which a plurality of quadrangular pillar-shaped honeycomb segments 11 (honeycomb fired bodies) is combined to each other, a block-shaped honeycomb block body is formed in such a manner that side surfaces of the honeycomb segments 11 are bonded to each other using a bonding material (not shown) (bonding process), and a circumferential surface of the honeycomb block body is ground. Similarly to the honeycomb structure 1 described above, this honeycomb structure 12 is configured such that a circumference coating material is applied to a circumferential surface 13 of the honeycomb block body and a circumferential wall 14 is formed. In addition, the honeycomb structure 12 has a bonding layer 15 composed of the bonding material between the honeycomb segments 11. Note that in FIG. 4, similarly to the honeycomb structure 1, hatching indicating the circumferential wall 14 of the circumferential surface 16 in the honeycomb structure 12 is omitted for brevity of illustration.

The bonding material to be used contains water, an inorganic binder, an organic binder, a dispersing agent, and the like based on the ceramic raw material to be used as the forming material of the honeycomb formed body, as with the circumference coating material described above. Here, at least colloidal silica is contained as a kind of the inorganic binder. That is, as with the circumference coating material, the colloidal silica produced by any one of the "water glass method" and the "alkoxide method" is used. Therefore, the bonding material is likely to contain a small amount of chlorine component.

Therefore, the circumference coating material of the present embodiment is characterized in that a chlorine concentration of the colloidal silica to be used as a part of the raw materials to be used is 150 ppm or less. That is, as described above, sulfuric acid, phosphoric acid, acetic acid, or organic acid other than the hydrochloric acid is used for the acid treatment in the production process of the colloidal silica compared with the colloidal silica produced using mainly the hydrochloric acid. Thereby, the chlorine concentration of the colloidal silica becomes from about 1000 ppm to 500 ppm or less. When the circumference coating material and the bonding material are prepared using such colloidal silica, the chlorine concentration becomes 150 ppm or less in the circumference coating material and the bonding material. Then, the honeycomb structure 1 finally has a chlorine concentration of 100 ppm or less.

Next, a method of producing the honeycomb structure using the circumference coating material according to the present embodiment will be described. Here, a process of extruding the honeycomb formed body from the forming material (kneaded material) based on the ceramic raw material prepared in advance and after the subsequent firing process, a process of obtaining the round pillar-shaped honeycomb fired body 6 are already well known processes in the method of producing the honeycomb structure. Accordingly, a detailed description of these processes will be omitted. Note that since the extruded honeycomb formed body is fired at a high temperature, even when a raw material containing a large amount of chlorine component in the forming material is used, the chlorine component is dispersed by heating. As a result, the obtained honeycomb fired body 6 hardly contains the chlorine component.

(1) Grinding Process

The circumferential surface of the round pillar-shaped honeycomb fired body 6 formed through the firing process is ground using a well-known grinder. Thus, the deformation having occurred in the entire honeycomb formed body or a part of the cell deformed by its own weight or the like after the extrusion is removed. Thus, the honeycomb fired body 6 is formed, in which an imperfect partition wall 4a (see FIG. 3) is in a state of being exposed on the surface of the ground circumferential surface 7. In this state, the surface of the circumferential surface 7 is very weak, and the imperfect partition wall 4a formed on the circumferential surface 7 is easily peeled off by a slight impact.

(2) Circumferential Wall Forming Process

When the honeycomb fired body 6 is ground, the imperfect partition wall 4a extending along the direction of the central axis is exposed on the ground circumferential surface 7. The circumference coating material is applied to the circumferential surface 7 on which the imperfect partition wall 4a is exposed. At this time, the circumference coating material to be used has the chlorine concentration of 150 ppm or less as described above. As a result, the recessed groove 10 of the cell 3a located on the circumferential surface 7 is filled with the circumference coating material, and the circumferential surface 7 is covered with the circumference coating material. The applied circumference coating material is subjected to drying, and thus the circumferential wall 8 is formed. The circumferential wall 8 protects an internal structure of the honeycomb fired body 6. Note that in FIGS. 1 and 2, a hatched outside area indicates a state of the circumferential wall 8 formed by the circumference coating material. Thus, the production of the honeycomb structure 1 using the circumference coating material of the present embodiment is completed.

(3) Heating Process

In the method of producing the honeycomb structure of the present embodiment, a heating process may be performed as necessary, in which the honeycomb structure 1 obtained in the process (2) is introduced into a heating furnace and is subjected to a heating treatment at a heating temperature of 600° C. or more for a predetermined time. It is known that the chlorine component is dispersed by heating at a high temperature. For this reason, it is possible to remove the chlorine component contained in the circumference coating material and to reduce the chlorine concentration contained in the honeycomb structure 1 by the heating treatment of the honeycomb structure 1 which is a produced final product. Thus, the chlorine concentration of the entire honeycomb structure 1 can be made 100 ppm or less.

(4) Honeycomb Structure using the Bonding Material

Even in the above-described honeycomb structure 12 having the configuration according to another embodiment of the present invention, the colloidal silica to be used as a part of the raw materials to be used for the bonding material has the chlorine concentration of 150 ppm or less, as with the circumference coating material. Thus, the chlorine concentration of the honeycomb structure 12 finally becomes 100 ppm or less.

Examples of the circumference coating material of the present invention and the honeycomb structure using the circumference coating material will be described below, but the circumference coating material and the honeycomb structure of the present invention are not limited to these embodiments. Note that it is assumed that the bonding material uses the same colloidal silica and exhibits approximately the same result as the circumference coating material, and thus the bonding material is not present in Examples.

EXAMPLES (1) Chlorine Concentrations of Colloidal Silica and Circumference Coating Material before and after Drying and Influence of Heating Treatment Circumference coating materials were prepared using colloidal silica (Examples 1 to 7, and Comparative Example 1) having different chlorine concentrations. Table 1 described below indicates measurement results of chlorine concentrations of colloidal silica used, chlorine concentrations of circumference coating materials before drying, and chlorine concentrations of circumference coating materials after drying. Note that with respect to Examples 6 and 7, a chlorine concentration of the circumference coating material at each heating temperature after the heating process described above was performed is indicated together.

The chlorine concentrations were measured using thermal hydrolysis-ion chromatograph analysis method. Specifically, a measuring object sample placed under an inert atmosphere is subjected to heating decomposition (thermal hydrolysis) in vapor stream, and chlorine is trapped in an alkaline solution, whereby a sample solution is prepared. The obtained sample solution is analyzed using an ion chromatography mass spectrometer (IC-MS), and the amount of chlorine ions in the sample solution is measured. Thus, the chlorine concentration is measured.

TABLE 1

| | | | Example 1 | Example 2 | Example 3 | Example 4 | Example 5 | Example 6 | Example 7 | Comparative Example 1 |
|---|---|---|---|---|---|---|---|---|---|---|
| Chlorine concentration | Colloidal silica | ppm | 10 | 55 | 73 | 284 | 499 | 943 | 943 | 943 |
| | Circumference coating material before drying | ppm | 8 | 17 | 20 | 61 | 102 | 187 | 187 | 187 |
| | Circumference coating material after drying | ppm | 11 | 24 | 29 | 86 | 145 | 267 | 267 | 267 |
| | Circumference coating material after heating treatment | ppm | — | — | — | — | — | 134 | 80 | — |
| Heating temperature | | °C. | — | — | — | — | — | 600 | 675 | — |

As indicated in Table 1, the colloidal silica at 500 ppm or less in Examples 1 to 5 was used, it was confirmed that the chlorine component became 150 ppm or less even in the circumference coating material before drying and the circumference coating material (circumferential wall) after drying. That is, it is possible to reduce the chlorine concentration of the circumference coating material itself by suppression of the chlorine concentration of the colloidal silica to be used for the circumference coating material.

Meanwhile, with respect to Examples 6 and 7 and Comparative Example 1, the chlorine concentration of the colloidal silica is 943 ppm, and the chlorine concentration is high compared to Examples 1 to 5. For this reason, the chlorine concentration of the circumference coating material (or circumferential wall) is 150 ppm or more in both before and after drying, and exceeds the upper limit value of the chlorine concentration in the present invention. Therefore, it is necessary to use the colloidal silica having the chlorine concentration of at least 500 ppm or less for the circumference coating material.

As indicated in Example 6 or 7, however, the chlorine concentration of the circumference coating material (circumferential wall) after heating is 134 ppm or 80 ppm when the heating treatment is performed on the circumference coating material after drying. Accordingly, the chlorine component contained in the circumference coating material is evaporated to the outside by the heating treatment of the circumference coating material (circumferential wall) at the heating temperature of 600° C. or more, and the chlorine concentration can be lowered.

Particularly, when the heating treatment is performed at the heating temperature of 675° C. in Example 7 that is higher than the heating temperature of 600° C. in Example 6, the chlorine concentration of the circumference coating material can be made a significantly low value of 100 ppm or less. Therefore, desirably, the heating is performed at the heating temperature of at least 600° C. or more and more preferably 675° C. or more. However, when the heating temperature is too high, there is high possibility of causing a problem such as crack occurrence in the honeycomb structure and/or the circumference coating material, and thus it is necessary to avoid the heating at an excessive heating temperature.

From the above-described results, it was confirmed that even when colloidal silica having a high chlorine concentration of about 1000 ppm was used for the circumference coating material, the chlorine concentration could be suppressed by the heating treatment to be within the upper limit value of the chlorine concentration in the present invention, which had practical use. Note that in Comparative Example 1, the same colloidal silica as in Example 6 or 7 was used, and the heating treatment was not performed for comparison.

(2) Chlorine Concentration of Honeycomb Structure

A circumference coating material prepared using colloidal silica of each of Examples 1 to 7 and Comparative Example 1 was applied to a circumferential surface of a cordierite honeycomb structure which was monolithically formed by extrusion, and a circumferential wall was formed. The measurement result of a chlorine concentration of each of the obtained honeycomb structures (Examples 1 to 7 and Comparative Examples 1 and 2) was indicated in Table 2 described below. Here, Comparative Example 2 indicates a case where the circumference coating material (see Table 1) of Comparative Example 1 is applied to a honeycomb structure having a different partition wall thickness and porosity.

Each of the honeycomb structures has a partition wall thickness: 0.15 mm, a cell density: 46.5 cells/cm$^2$, porosity: 60%, a honeycomb diameter of the honeycomb structure: 144 mm, a total length of the honeycomb structure: 152 mm, a total weight: 770 g, a weight of the circumference coating material (circumferential wall) after drying: 293 g, and a weight of substrate: 477 g (excluding Comparative Example 1). The honeycomb structure of Comparative Example 1 has a partition wall thickness: 0.20 mm, a cell density: 46.5 cells/cm$^2$, porosity: 35%, a honeycomb diameter of the honeycomb structure: 144 mm, a total length of the honeycomb structure: 152 mm, a total weight: 1130 g, a weight of the circumference coating material (circumferential wall) after drying: 293 g, and a weight of substrate: 837 g.

TABLE 2

| | | Example 1 | Example 2 | Example 3 | Example 4 | Example 5 | Example 6 | Example 7 | Comparative Example 1 | Comparative Example 2 |
|---|---|---|---|---|---|---|---|---|---|---|
| Partition wall thickness | mm | 0.15 | 0.15 | 0.15 | 0.15 | 0.15 | 0.15 | 0.15 | 0.20 | 0.15 |
| Cell density | Number of cells/cm$^2$ | 46.5 | 46.5 | 46.5 | 46.5 | 46.5 | 46.5 | 46.5 | 46.5 | 46.5 |

TABLE 2-continued

|  |  | Example 1 | Example 2 | Example 3 | Example 4 | Example 5 | Example 6 | Example 7 | Comparative Example 1 | Comparative Example 2 |
|---|---|---|---|---|---|---|---|---|---|---|
| Porosity | % | 60 | 60 | 60 | 60 | 60 | 60 | 60 | 35 | 60 |
| Diameter | mm | 144 | 144 | 144 | 144 | 144 | 144 | 144 | 144 | 144 |
| Total length | mm | 152 | 152 | 152 | 152 | 152 | 152 | 152 | 152 | 152 |
| Total weight of honeycomb structure | g | 770 | 770 | 770 | 770 | 770 | 770 | 770 | 1130 | 770 |
| Weight of coating material after drying | g | 293 | 293 | 293 | 293 | 293 | 293 | 293 | 293 | 293 |
| Weight of substrate | g | 477 | 477 | 477 | 477 | 477 | 477 | 477 | 837 | 477 |
| Chlorine concentration of honeycomb structure | ppm | 5 | 10 | 11 | 33 | 56 | 51 | 31 | 70 | 102 |

As indicated in Table 2, it was confirmed that the chlorine concentration of the honeycomb structure was 100 ppm or less in each of Examples 1 to 7. Note that Examples 6 and 7 indicate results of which the circumference coating material is subjected to the heating treatment after being applied. In any of Examples 6 and 7, since the chlorine concentration of the honeycomb structure was 100 ppm or less, it was confirmed that there was little risk of corrosion caused by the chlorine component even when the honeycomb structure was used for exhaust system pipes or the like.

The circumference coating material, the bonding material, the honeycomb structure, and the method of producing the honeycomb structure of the present invention can be used for producing the honeycomb structure applicable to a catalyst carrier for purifying vehicle exhaust gases, a diesel particulate removing filter, a heat storage body for a combustion apparatus, or the like.

DESCRIPTION OF REFERENCE NUMERALS 1, 12: Honeycomb structure, 2a: One end face, 2b: Other end face, 3a: Cell, 4: Partition wall, 4a: Imperfect partition wall, 5: Honeycomb structure body, 6: Honeycomb fired body, 7, 9, 13, 16: Circumferential surface, 8, 14: Circumferential wall, 10 Recessed groove, 11: Honeycomb segment, 15: Bonding layer

What is claimed is:

1. A honeycomb structure having at least one recessed groove extending in an axial direction at which at least one cell is opened to the outside and a circumference coating material filling the recessed groove to cover the circumferential surface and form a circumferential wall on the circumferential surface, wherein
    the circumference coating material includes colloidal silica in a part of raw materials to be used and has a chlorine concentration after drying of 150 ppm or less, and
    wherein the honeycomb structure has a chlorine concentration of 100 ppm or less.

2. A plurality of honeycomb fired bodies formed into a quadrangular pillar-shape and bonded to each other by a bonding material to form a block-shaped honeycomb structure, wherein
    the bonding material includes colloidal silica in a part of raw materials to be used and has a chlorine concentration after drying of 150 ppm or less, and
    wherein the honeycomb structure has a chlorine concentration of 100 ppm or less.

3. A method of producing a honeycomb structure comprising:
    at least any one of a circumferential wall forming process in which a circumference coating material is applied to a circumferential surface of a honeycomb structure to fill a recessed groove opened to the outside and extending in an axial direction and to cover the circumferential surface, thereby forming a circumferential wall on the circumferential surface and a bonding process in which a plurality of honeycomb fired bodies formed into a quadrangular pillar-shape are bonded to each other in combination with a bonding material, thereby forming a block-shaped honeycomb structure;
    a drying process of drying the at least one of the circumference coating material and bonding material; and
    a heating process of performing a heating treatment at a heating temperature of 600° C. or more on the honeycomb structure formed through the circumferential wall forming process and/or the bonding process,
    wherein the circumference coating material includes colloidal silica in a part of raw materials to be used and has a chlorine concentration after drying of 150 ppm or less, and the bonding material includes colloidal silica in a part of raw materials to be used and has a chlorine concentration after drying of 150 ppm or less, and
    wherein the honeycomb structure subjected to the heating process has a chlorine concentration of 100 ppm or less.

4. The method of producing the honeycomb structure according to claim 3, wherein
    the colloidal silica to be used has a chlorine concentration of 500 ppm or less.

5. The method of producing the honeycomb structure according to claim 4, wherein the colloidal silica is produced using at least any one acid of sulfuric acid, phosphoric acid, and organic acid.

6. The method of producing the honeycomb structure according to claim 5, wherein the organic acid is an acetic acid.

* * * * *